Figure 1:
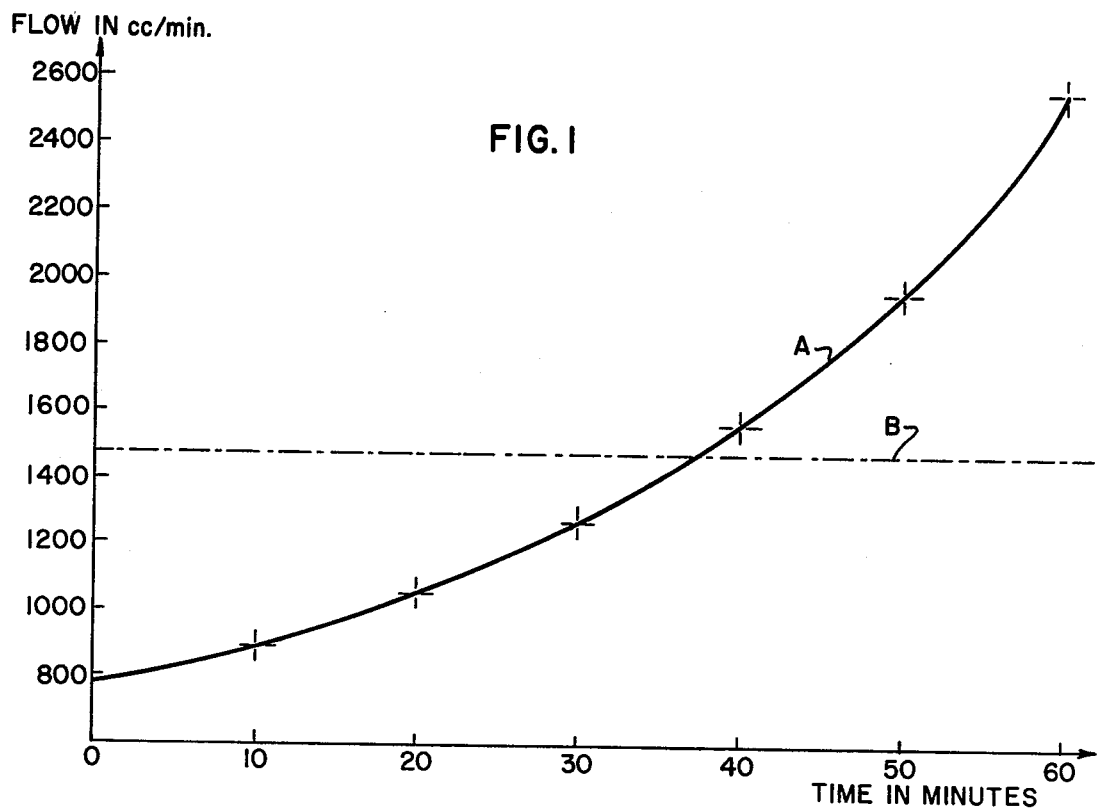

United States Patent [19]

Donnet et al.

[11] 4,243,428

[45] Jan. 6, 1981

[54] PROCESSES FOR THE MANUFACTURING OF PRECIPITATED SILICA

[76] Inventors: Jean-Baptise Donnet, 29, rue Zundlae, 68 Didenheim; Georges Vrisakis, 4 quai de la Plage, 69 Collonges; Maurice Coudurier, 30 rue Tutor Hauges, 69 Maysicu; Bernard Baudru, 4 allee Maurice Ravel, 38 Echirolles, all of France

[21] Appl. No.: 6,153

[22] Filed: Jan. 24, 1979

Related U.S. Application Data

[63] Continuation of Ser. No. 685,512, May 12, 1976, abandoned, which is a continuation of Ser. No. 542,654, Jan. 21, 1975, abandoned, which is a continuation of Ser. No. 260,412, Jun. 7, 1972, abandoned.

[51] Int. Cl.³ .......................... C01B 33/18; C09C 1/28

[52] U.S. Cl. .................... 106/288 B; 423/339; 106/309

[58] Field of Search ................. 106/288 B; 423/339, 423/335, 338

[56] References Cited

U.S. PATENT DOCUMENTS

| | | | |
|---|---|---|---|
| 3,325,249 | 6/1967 | Burke, Jr. et al. | 423/339 |
| 3,503,707 | 3/1970 | Burke, Jr. | 423/339 |

Primary Examiner—Jacqueline V. Howard
Attorney, Agent, or Firm—Robert Osann; Robert L. Price; Harold H. Flanders

[57] ABSTRACT

Process for the manufacturing of silicas having a specific surface area ranging between 100 and 600 sq m/g, which does not vary upon drying, due to the action of a strong acid on an alkaline silicate, characterized by the fact that the addition of strong acid to the alkaline silicate is interrupted one to three times.

6 Claims, 3 Drawing Figures

PROCESSES FOR THE MANUFACTURING OF PRECIPITATED SILICA

This is a continuation of application Ser. No. 685,512 filed May 12, 1976, which is a continuation of application Ser. No. 542,654 filed Jan. 21, 1975, which is a continuation of application Ser. No. 260,412 filed June 7, 1972.

The present invention relates to new processes for the manufacturing of precipitated silica.

In accordance with the provisions of prior art processes, precipitated silica is obtained by causing an alkaline silicate, such as sodium silicate, to react with an acid, under conditions which influence the properties of the silica finally obtained. Thus, the choice of the silicate concentration initially used has an important influence on the properties of the silica finally obtained. Also influential is the choice of the acid—weak or strong—and its concentration, the subsequent adding of reagents to the reacting medium, the speed at which they are added, the agitation to which the reactng medium may be subjected, and the temperature at which the reaction takes place. All these factors play determining roles with respect to influencing the properties of the final product.

In particular, in order to obtain silicas which may also be used as fillers in rubber, i.e., whose specific surface area is approximately 200 sq m/g, by the continuous addition of acid to the silicate, it is possible to proceed at a high temperature for a brief period of time or at a lower temperature for a very long period of time. Furthermore, it is possible to add soluble salts such as sodium chloride, for example, to the silicate. Nevertheless, in the case where a high working temperature is used for a brief period of time, it is difficult to obtain products displaying specific surface areas determined within sufficiently narrow limits. In the other two cases, there is the problem of dispersing the acid during the gelification phase, as well as the need to stabilize the specific area by resorting to costly heating of long duration. Moreover, upon operating at a low temperature and for a prolonged period of time, the productivity obtained is small and, in the case where chloride is used in the reaction, it is necessary to recycle the mother liquors containing chloride.

Now, since the gelification phase corresponds to the most important moment in the reaction, during which the characteristics of the final product are determined, it is very important that the mixture be homogeneous during this phase. As a consequence, it was proposed to resolve the problem posed by dispersion of the acid during the gelification phase, by adding acid to the silicate, at a varying speed, according to the following procedures: first a quick addition followed by a slow addition during the gelification period until more than half of the total acid has been added; then the rest of the acid is added more quickly.

Furthermore, various processes for the continuous manufacturing of precipitated silica have been proposed. In particular, a process was considered whereby the reagents would be added directly—i.e., the silicate and the acid—to the same reactor in which they would be left to react for a very brief period of time. On the other hand, another process was proposed in which a mixture of silicate and of an electrolyte—indifferent with respect to the products taking part in the reaction—would be made to react with an acid in a homogeneous reactor subjected to agitation.

Furthermore, it has been proposed to carry out the reaction in a series of reacting zones, whereby the acid would be added in such a way as to permit uniformity of the alkalinity reduction in each zone.

Another previously known process for the continuous manufacturing of precipitated silica proposed that the reaction be carried out under pressure in order to accelerate the reaction speeds and the passage time in the reactor, so as to permit a regular growth of the particles.

Nevertheless, the continuous processes have the common disadvantage of giving rise to products wherein it is very difficult to control the granulometric distribution within narrow limits, as would actually be desirable.

An object of the present invention is to provide processes for manufacturing pigments of silica having a narrow granulometric distribution curve and displaying a large specific area for a small water content in the cake. This specific area would remain constant after drying, without requiring stabilization.

A further object of the present invention is to provide the improved silica pigments obtained by means of the above-mentioned processes.

In addition, an object of the present invention is to provide a process for the manufacturing of silicas having a specific area ranging between 100 and 600 sq m/g which does not vary upon drying, due to the effect of a strong acid on an alkaline silicate. The process of the present invention is characterized by the fact that the addition of strong acid to the alkaline silicate is interrupted one to three times. The first interruption takes place when the $SiO_2/Na_2O$ molar ratio reaches 5.5 and is preferably between 5.5 and 7.

According to another embodiment of the process which is the subject of the present invention, the addition of strong acid to the alkaline silicate is again interrupted when the $SiO_2/Na_2O$ molar ratio reaches 10 and preferably when it is between 10 and 25.

According to another embodiment of the process which is the subject of the present invention, the temperature of the reacting medium is varied during two phases in which strong acid is successively added to the silicate, separated by one interruption.

According to a third embodiment of the process which is the subject of the present invention, the speed at which the acid is added is varied according to a law such that the variation in the residual alkalinity of the medium as a function of the time is constant.

According to another embodiment involved in this type of application, the value of the above-mentioned constant is made to vary from one addition phase of the acid to the other.

According to an embodiment of the process which is the subject of the present invention, this takes place in a discontinuous manner.

According to another embodiment of the process which is the subject of the invention, the precipitated silicas are manufactured continuously in a succession of zones, each of which corresponds to one specific stage in the precipitation. The addition of the acid is the object of at least an initial interruption in one of these zones when the $SiO_2/Na_2O$ molar ratio is equal to or greater than 5.5, while in the zone preceding that where the first acid addition interruption takes place—in which the $SiO_2/Na_2O$ molar ratio ranges between 4.5 and 5.5—the reaction between the acid and the silicate takes place under conditions such that gelification does not occur.

According to another preferred embodiment of this invention the process is carried out continuously, the reaction zone of the acid on the silicate—which corresponds to an SiO$_2$/Na$_2$O molar ratio ranging between 4.5 and 5.5—is a zone with piston advancement, thus preventing the formation of gel.

The critical characteristic of the molar ratios mentioned above stands out clearly when studying the phenomena observed during the different advancement stages involved in the silica acid polycondensation reaction, which results from the action of an acid on an alkaline silicate.

Actually, up to molar ratios of from 4.3 to 5, the monomer silicate is transformed into oligomer silicas with an almost constant speed (it may be noted that the designation of oligomers is given to those silicas in the colloidal state consisting of particles of 10 Å and more, which agglomerate in the form of centrifugable polymers separating from oligomers by centrifugation; but they are not filterable or in the form of a precipitate whose degree of agglomeration is such that the silica obtained is filterable). When the polycondensation speed is faster than the acidification speed, we have the immediate transformation of the acidified silicate into oligomers at any instant.

The second stage corresponds to molar ratios of from 4.5 to 5.5. The second stage is characterized by the appearance of opalescence, followed by a fast rise in the viscosity. During this stage, the monomer silicate continues to be transformed into ligomers, which agglomerate into polymers that are precipitated.

During the second stage, the concentration and temperature characteristics are very critical, and the agglomeration speeds are very high. It may be noted that this stage begins at the moment when the quantity of oligomers is maximal and finishes at the point where this quantity has diminished very rapidly. Furthermore, during the course of this stage, the polymer formation passes through a maximum and decreases very quickly.

If the acidification process is stopped during the second stage, the monomer silicate concentration does not vary (the polycondensation reaction is thus faster than the acidification) and the oligomers, as well as the polymers, continue to agglomerate, providing a precipitate.

The third stage corresponds to molar ratios of from 15 to 25. During the third stage, the monomer and the precipitate are present almost alone.

Up to molar ratios of from 8 to 10, the reaction speeds are higher than they are subsequently.

If the acidification process is interrupted during the course of the third stage, the monomer concentration does not vary, but the surface of the final product is reduced and the gel is transformed into aggregates of spherically shaped particles, by peptization.

The fourth stage corresponds to molar ratios of 15—25 to infinity (Na$_2$O=0). During this stage, all of the silica is in the form of a precipitate and the occluded sodium hydroxide is neutralized.

The process according to the present invention is advantageously, but not restrictively, carried out by using an anhydrous alkaline silicate whose concentration ranges between 100 and 200 g/liter of silicate and whose SiO$_2$/Na$_2$O molar ratio ranges between 1 and 4, and by using an acid whose concentration is such that the final SiO$_2$ concentration ranges between 50 and 100 g/liter, and the temperature of the reaction is advantageously maintained between 40° and 95° C.

In accordance with the invention, the total duration of the period during which acid is added to the silicate ranges advantageously between 40 and 180 minutes, and the interruptions in this addition, which range from 1 to 3, are at least 5 minutes in length and preferably on the order of 5 to 30 minutes.

According to a preferred embodiment of the invention, the acid is added to the silicate at a speed varying according to a law such that the residual alkalinity and the concentration of the total silica decrease linearly as a function of the reaction time, in accordance with the following equation:

$$D = \frac{Vi(\frac{Ci}{62} + \frac{Ca}{98})\frac{Ci}{62}}{T(\frac{Ci}{62} + \frac{Ca}{98} - \frac{Ci \times t}{62 \times T})^2}$$

in which:
D = flow at any time t
Vi = volume of initial silicate
Ci = Na$_2$O concentration of the initial silicate expressed in g/liter
Ca = concentration of the acid used, expressed in g/liter
T = total time of the reaction
t = time In addition to the preceding provisions, the present invention also includes other provisions which will be seen in the description below.

The present invention is particularly concerned with processes for manufacturing precipitated silica in accordance with the preceding provisions, as well as with means suitable for the application and realization of these processes, the processes as a whole including those processes carried out in accordance with the present invention, the products obtained upon utilizing these processes, and the materials in which the latter products are included.

The invention can be better understood with the aid of the supplmentary description that follows, referring to the examples of different ways in which the invention can be applied. These examples are only given by way of illustrating the invention and are not at all limited in character.

EXAMPLE 1

(I) 84.3 liters of sulfuric acid equal in density to 1.050 is added in a constant flow to 99.7 liters of silicate having a concentration of 145.3 g/liter of SiO$_2$ and 42.9 g/liter of Na$_2$O. This takes place in an agitated 200 liter reactor at a temperature of 63° C. After 28 minutes of adding the acid, i.e., when the SiO$_2$/Na$_2$O molar ratio reaches 5.5, the addition of acid is stopped for 10 minutes. Then it is resumed once again at a constant speed until the reacting medium has reached a molar ratio of 10. The addition is subsequently stopped for 20 minutes, after which it is resumed until the pH of the reacting medium is equal to 5. This is followed by filtering, washing of the cake, drying, and crushing.

(II) By way of comparison, the silica is prepared according to the previously known classical processes, proceeding as follows:

Of 84.3 liters of sulfuric acid having a density of 1.050 is added within a space of 60 minutes and at a constant flow to an agitated 200 liter reactor containing 99.7 liters of silicate, whose SiO$_2$ concentration is 145.3 g/liter and whose Na$_2$O concentration is 42.9 g/l, maintaining the temperature at 76° C. Adding the acid is stopped when the pH of the reacting medium reaches a value of 5. Stabilization is then carried out, maintaining the temperature at 99° C. for one hour. This is followed by filtering, washing of the product, and drying.

The products obtained upon proceeding according to (I) and (II), respectively, have the following characteristics, which may be seen in Table 1 below:

TABLE 1

| | Water content of the cake in kg per kg of finished product | Specific area after drying | | |
|---|---|---|---|---|
| | | In an oven | With an atomizer | By cryodesiccation |
| Product I in accordance with the invention | 4 | 357 sq m/g | 362 sq m/g | 400 sq m/g |
| Product II | 5 | 190 sq m/g | 230 sq m/g | 300 sq m/g |

EXAMPLE 2

84.3 liters of sulfuric acid having a density of 1.050 is added at a constant flow to an agitated 200 liter reactor containing 99.7 liters of silicate, whose SiO$_2$ content is 145.3 g/liter and whose Na$_2$O content is 42.9 g/liter, maintaining the temperature at 73° C. When the SiO$_2$/Na$_2$O molar ratio reaches 5.5, adding of the acid is stopped for 10 minutes, upon heating up to 86° C. After these 10 minutes of interruption, the adding of the acid is resumed once again, maintaining the temperature at 86°, until the pH of the reacting medium reaches a value of 5. This is followed by filtering, washing the cake, drying it, and then crushing it. After drying with an atomizer, the specific area of the product is 320 sq m/g and the water content of the cake is 4.5 kg per kg of finished product.

EXAMPLE 3

Using a 200 liter reactor containing the silicate from Example 1, (I), acid is added at a varying speed so that dNa$_2$O/dt and thus dSiO$_2$/dt are constant. In the case described in the present example, dNa$_2$O, which is constant, is equal to 0.715. Adding of the acid is stopped when the reacting medium reaches a pH of 5. This is followed by filtering, washing of the cake obtained, and drying it. The curve showing the variation in the flow of acid as a function of the time is given in FIG. 1, where curve A represents the curve showing the variation in the flow of acid compared to constant flow B.

The reaction temperature was 76° C.

The product was dried with an atomizer and then crushed.

Figure 2:
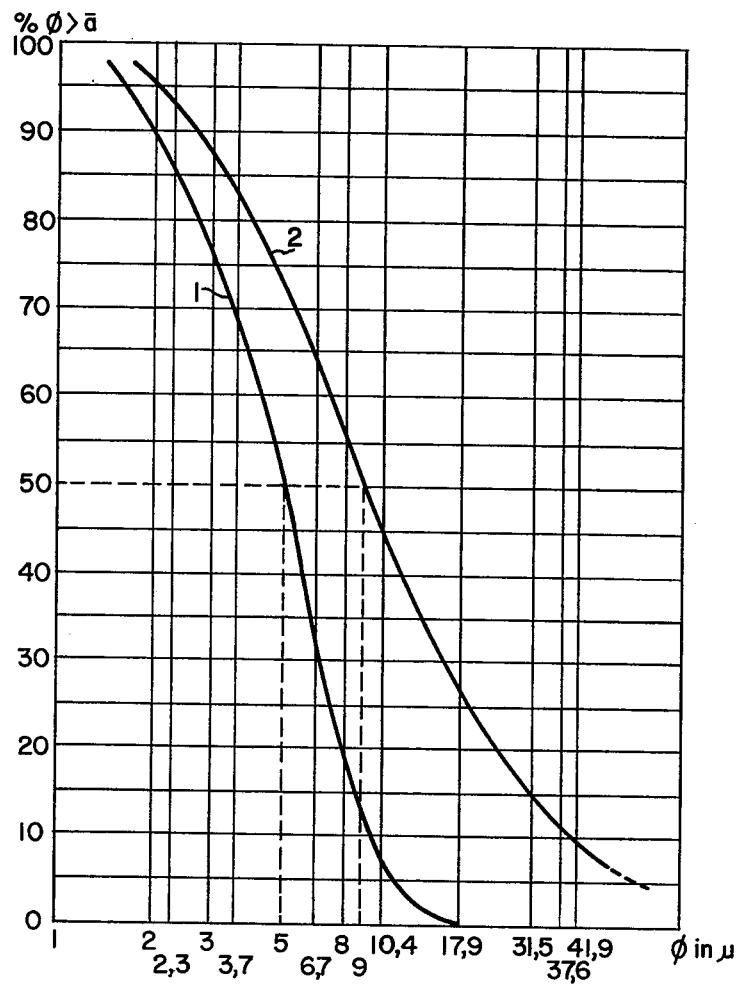

The water content of the cake is thus 4.25 kg of water per kg of finished product. The specific area of the product dried with the atomizer is 284 sq m/g. Its granulometric distribution curve is represented in FIG. 2, compared with a commercially known silica crushed under the same conditions. The cumulative distribution curve was determined according to the technique of BAHCO. The curve relative to the silica obtained in accordance with the invention is designated by reference 1, while the curve relative to the known commercial silica is designated by reference 2. A comparison of the curves in FIG. 2 shows a certain number of facts which are summarized in Table 2 below:

Table 2

Comparison of the granulometric distributions, determined according to BAHCO, of silica 1 in accordance with the invention and of silica 2 known commercially.

| 1 Narrow distribution | 2 Wide distribution |
|---|---|
| Average diameter at 50% = 5µ | Average diameter at 50% = 9µ (73% > 5µ) |
| No large particles 0% > 17.9µ | Presence of large particles 25.5% > 17.9µ |
| Average concentration of fines 14% < 2.3µ | Small concentration of fines 7.5% < 2.3µ |

EXAMPLE 4

The process according to the invention is carried out continuously, according to a general outline illustrated in FIG. 3 attached and specified in the description below.

The reaction takes place in a succession of zones, each of which corresponds to one determined stage in the precipitation:

In zone I, acid is added until an SiO$_2$Na$_2$O molar ratio of 4.3 to 5 is obtained, without attaining a gel, but in approaching the opalescence point.

In zone II, the most important stage of the reaction takes place, during which the majority of the product is precipitated. In this zone, the reaction speeds are very high and the Na$_2$O/SiO$_2$ concentration, the concentration of salts, and the temperature are critical, since they determine the quality of the final product. As a result, there must be a piston advancement upon passing from the final state of zone I to the final state of zone II, i.e., to a molar ratio of approximately 5.5. This is achieved by various appropriate means, in particular by sending the silicate coming from zone I into a mixer tube of the "STATIC MIXER" type, described in U.S. Pat. No. 3,286,992, or into any other type of tubular reactor in which the front of the speeds of the liquids is parallel. In such a reactor, the silicate reacts with the acid in a manner identical with that of the discontinuous process.

In zone IIIA, the resulting product subsequently remains without the addition of acid in a series of perfect homogeneous reactors 5, where the time that they spend here is at least two minutes. Once the gelification period has been terminated, the acid is added to a series of reactors 6 in order to obtain a molar ratio ranging between 6 and 9, which effectively corresponds to approximately 50% acidification.

In zone IIIB, acid is added until an SiO$_2$/Na$_2$O molar ratio of 10 is obtained, which corresponds to approximately 65% acidification, or a pH of 10, all while continuing to maintain a strict distribution of the staying times since the polycondensation speeds are still very high—after which a staying time of at least 10 minutes is observed in two reactors 8 in series. These are followed by reactors 9 in which the molar ratio of the mixture is brought between 15 and 25 (approximately 80% acidification, or a pH of 9). The 10 minute interruption period may be observed in any part of zone IIIB, even at the end of this period.

In zone IV, the rest of the acid is added until complete neutralisation, and the final paste obtained is brought to a pH of from 4 to 5. This may be done in two reactors 10 in series; a narrow distribution of the staying times is no longer necessary in this zone.

The reaction times are those of the discontinuous process.

In the continuous process, it is also possible to add the acid by following the same acidification law as in the discontinuous process, i.e., at a variable speed such that the disappearance speed of the $Na_2O$ and, consequently, the decrease in the $SiO_2$ concentration are constant. After zone II, it is also possible to work at temperatures different from those of zone I and II, without hardly affecting the properties of the final product obtained at all.

Figure 3:
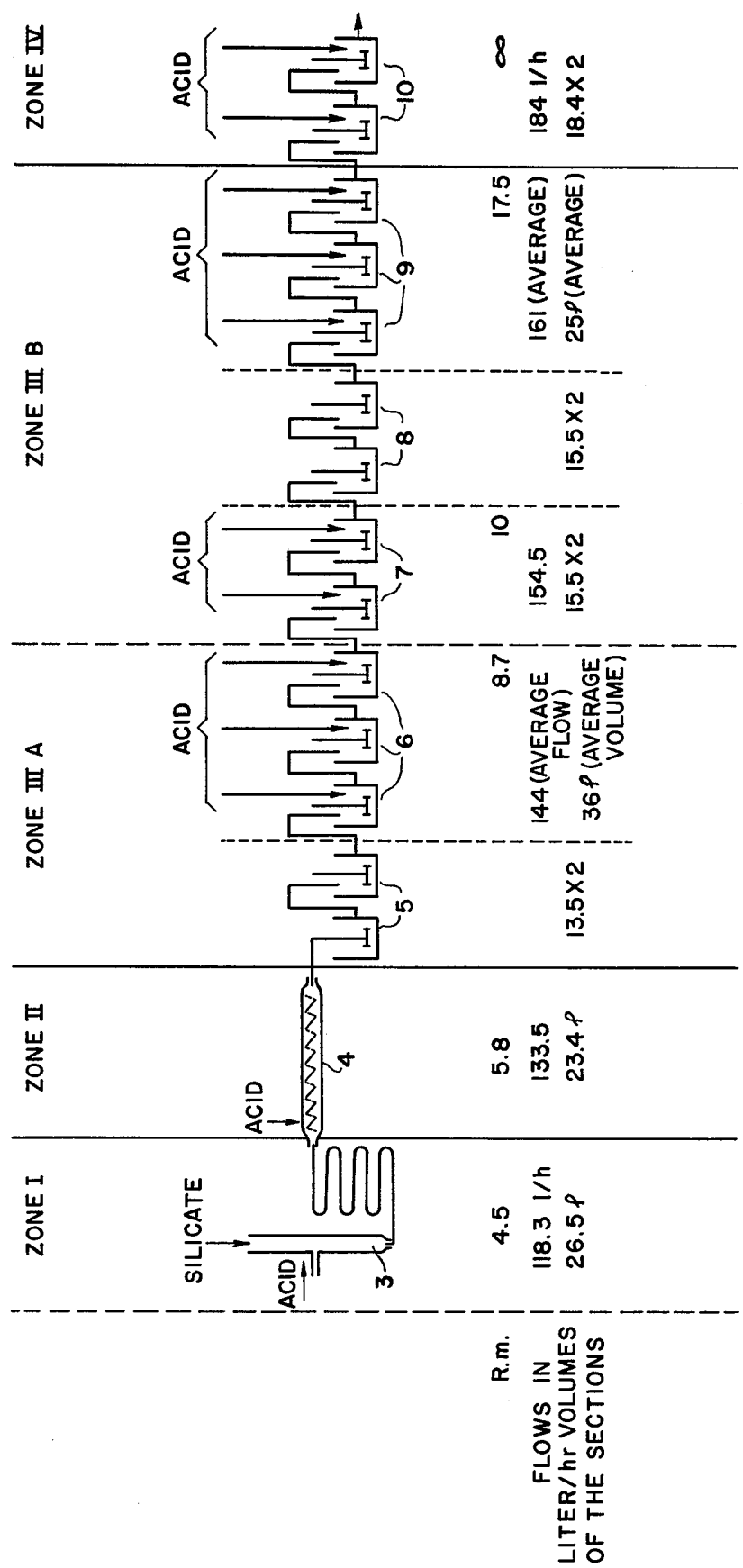

In the application example represented in FIG. 3, the acid is added until a molar ratio of 4.5 is obtained, into a reactor-injector 3, followed by a tubular reactor 120 mm in diameter and 6 m long, for example, in order to provide the whole set-up with the staying time characteristic of the discontinuous process—i.e., 28 minutes. Then acid is added in order to obtain a molar ratio of 5.5 to a "Static-Mixer" the piston advancement despite the viscosity. This addition is followed by a staying time of 12 minutes in two reactors 5, in series, in which the addition of acid is interrupted.

The reaction is then pursued until approximately 65% acidification in a continuous reactor-mixer or in a series of perfect homogeneous reactors 6, in which acid is added at several points.

This zone is followed by two reactors 8 in which the reacting mixture remained for 12 minutes without the addition of acid. The reaction was then pursued in a continuous reactor-mixture, or in a series of perfect homogenous reactors 9, in which the acid was added at three points, for example, up to neutralization of approximately 80% of the alkalinity (molar ratio 17.5).

The rest of the acid was added to two reactors until a pH of 5 was obtained. This is followed by filtering and then washing and drying of the cake obtained. The specific area of the silica obtained is 350 sq m/g for a water content of 4.5 kg/kg of finished product.

It can be seen from the preceding description that no matter what methods for developing, realizing, and applying the invention are used, there is obtained processes for the manufacturing of precipitated silica which have important advantages over the previously known processes. Certain of these advantages have already been mentioned above.

Obviously, the invention is not in any way limited to the methods of development, realization, and application described more specifically above. On the contrary, it embraces all variants which might occur in this area, without exceeding the framework or the scope of the present invention.

What we claim is:

1. A process for the preparation of stable precipitated silicas having surface areas ranging from between about 100 to 600 square meters per gram which do not substantially vary on drying which comprises the steps of:
   (a) forming an alkali metal silicate solution having a concentration of between about 100 to 200 grams per liter of alkali metal silicate and having an $SiO_2/Na_2O$ molar ratio of between 1 and 4;
   (b) adding sulfuric acid to said alkali metal silicate solution in a first stage at a temperature of about 40°–95° C. wherein the silicon dioxide to alkali metal oxide molar ratio is in the range of about 4.5 to 5.5 and wherein gellification does not occur;
   (c) continuing the addition of said sulfuric acid in a second stage at a constant rate of addition at a temperature of about 40°–95° C. until a point at which the reaction medium then reaches a molar ratio of silicon dioxide to alkali metal oxide of about 5.5 wherein the monomer silicate continues to be transformed into oligomers;
   (d) interrupting the addition of said sulfuric acid for a period of between about 5 and 30 minutes;
   (e) resuming the addition of said sulfuric acid in a third stage at a constant rate of addition and a temperature of about 40°–95° C. until a point at which the reaction medium reaches a molar ratio of silicon dioxide to metal oxide in a range of about 10 to 25;
   (f) interrupting the addition of said acid for a period of between about 5 and 30 minutes;
   (g) resuming the addition of said acid in a fourth stage at a temperature of about 40°–95° C. until the medium reaches a pH value of 5, wherein all of the silica is in the form of a precipitate and all alkali metal hydroxide is neutralized;
   (h) stopping the addition of said acid; and
   (i) recovering the precipitated silicas.

2. A process according to claim 1 wherein said alkali metal silicate is sodium silicate.

3. A process according to claim 2 wherein said process is carried out continuously in a succession of zones, each one of which corresponds to a specific stage in the precipitation of said silicas.

4. A process according to claim 3 wherein said first zone where the acid reacts on the silicate having an $SiO_2/Na_2O$ molar ratio between about 4.5 and 5.5 is a piston advancement zone for preventing the formation of gel.

5. The process according to claim 4 wherein said acid is added to the silicate at a variable speed whereby residual alkalinity and the concentration of the total silica decreases linearly as a function of the reaction time, in accordance with the formula:

$$D = \frac{Vi(\frac{Ci}{62} + \frac{Ca}{98})\frac{Ci}{62}}{T(\frac{Ci}{62} + \frac{Ca}{98} - \frac{Ci \times t}{62 \times T})^2}$$

wherein:
D = the flow at any time t
Vi = the volume of the initial silicate
Ci = the $Na_2O$ concentration of the initial silicate, expressed in g/liter
Ca = the concentration of the acid used, expressed in g/liter
T = the total reaction time
t = time.

6. A process according to claim 2 wherein the sulfuric acid added is equal in density to 1.050 to a constant flow of silicate having a concentration of 145.3 g/liter of $SiO_2$ and 42.9 g/liter of $Na_2O$ at a temperature between 40° and 95° C. during a time period of from 40 to 180 minutes.

* * * * *

UNITED STATES PATENT AND TRADEMARK OFFICE
CERTIFICATE OF CORRECTION

PATENT NO. : 4,243,428
DATED : January 6, 1981
INVENTOR(S) : Jean-Baptiste Donnet et al.

It is certified that error appears in the above—identified patent and that said Letters Patent is hereby corrected as shown below:

Column 1, line 22, "reactng" should be -- reacting --.

Column 4, line 43, "supplmentary" should be -- supplementary --.

Column 6, line 68, "neutralisation" should be -- neutralization --.

Column 7, line 22, after "Static-Mixer", insert -- 4, which assures --.

Signed and Sealed this

Fourteenth Day of April 1981

[SEAL]

Attest:

RENE D. TEGTMEYER

Attesting Officer     Acting Commissioner of Patents and Trademarks